United States Patent Office 3,666,552
Patented May 30, 1972

3,666,552
METHOD FOR GIVING ELECTRIC CONDUCTIVITY TO NON-CONDUCTOR
Buichiro Ayukawa, Tokyo, Japan, assignor to Shikoku Paper Manufacturing Co., Iyomishima-shi, Japan
No Drawing. Filed Nov. 16, 1970, Ser. No. 90,019
Claims priority, application Japan, Dec. 3, 1969, 44/97,092
Int. Cl. B44d 1/18; C23c 3/00
U.S. Cl. 117—227          50 Claims

ABSTRACT OF THE DISCLOSURE

A method for imparting electric conductivity to a non-conductor comprises depositing copper on its surface by heating the non-conductor at a temperature not exceeding 100° C. in an aqueous solution of a complex of cuprous thiocyanate and thiourea. In the case of an absorbent non-conductor, the latter can be treated with an aqueous or organic solution of the complex at room temperature, the non-conductor is made alkaline at a temperature not exceeding 100° C. by exposing it to ammonia gas, whereupon copper is deposited within and on the surface of the non-conductor.

BACKGROUND OF THE INVENTION

There have been many attempts recorded in the prior art for depositing copper on the surface of a non-conductor by chemical plating processes.

Some of the prior art processes are disclosed in Japanese Patents Nos. 432,061, 431,799 and 310,519.

All of these prior art processes for depositing copper on the surface of a non-conductor by chemical plating process necessitate pretreatment comprising three processes, namely, (1) chemical etching, (2) sensitizing and (3) activation of the surface of the non-conductor; thus, a pretreated non-conductor is treated by any one of the following processes whereby copper is deposited on the surface of the non-conductor;

Formaline is added as a reducing agent to sodium hydroxide solution of cupric sulfate in which glycerol is added (Japanese Patent No. 432,061);

Formaline is added as reducing agent to sodium hydroxide solution of cupric sulfate in which lactic acid is added;

Formaline is added as reducing agent to sodium hydroxide solution of cupric sulfate in which citric acid is added;

Formaline is added as reducing agent to sodium hydroxide solution of cupric sulfate in which Rochelle salt is added;

Formaline is added as reducing agent to the mixed solution of potassium carbonate, potassium hydroxide and cupric sulfate in which Rochelle salt and acetylamino-ethyl-ethanolamine or aminoethyl-ethanolamine are added (Japanese Patent No. 431,799);

Hydrosulfite is added as reducing agent to ammoniacal solution of cupric sulfate or cupric chloride in which Rochelle salt is added (Japanese Patent No. 310,519).

SUMMARY OF THE INVENTION

The present invention relates to a method in which each of cupric salt, glycerol, lactic acid, citric acid, Rochelle salt, formaline or hydrosulfite is not used. According to the present invention, $Cu((SCN_2H_4)_3)SCN$ which is a complex of cuprous thiocyanate CuSCN and thiourea is used as a copper compound.

The non-conductor to be given electric conductivity is placed in an aqueous or organic solution of the complex without the pretreatment mentioned above, made alkaline with ammonia, ethanolamine, diethanolamine, triethanolamine or ethylenediamine and heated, thereby electro-conductive copper is deposited in it and/or on its surface, thus conductivity can be obtained.

If the complex solution is alkalized with an alkali hydroxide or carbonate in place of ammonia or amines mentioned above, copper can not be deposited but then copper sulfide is deposited which is non-conductive, therefore conductivity can not be obtained.

The reason why a cuprous salt is used in the present invention is that it is easier to reduce cuprous ion to copper than to reduce cupric ion to copper. However, solubility of a cuprous salt in water or an organic solvent is generally too small and therefore, it is necessary to increase the solubility thereof.

For increasing the solubility thereof, it is necessary to convert the cuprous salt into a complex and for making the complex thiourea has been used.

Further, it is well known that thiourea itself is a reducing agent and therefore, use of a complex of cuprous salt and thiourea as disclosed in the present invention does not necessitate a use of any other reducing agent.

Now, an explanation is made hereunder why cuprous thiocyanate is used as the cuprous salt.

Generally, when an alkaline solution of complex of heavy metal salt and thiourea is heated, metal ion thereof precipitates as sulfide.

There is no fact that every complex of cuprous salt and thiourea produces metallic copper by reduction of cuprous ion when alkaline solution thereof is heated. For example, an aqueous solution of $Cu((SCN_2H_4)_3)Cl$ which is the complex of cuprous chloride and thiourea is alkaline itself even if alkali is not added thereto, and when this is heated, copper sulfide is produced and it is impossible to reduce the copper.

On the other hand, $Cu((SCN_2H_4)_3)SCN$ disclosed in the present invention does not produce copper sulfide when an alkaline aqueous solution thereof is heated, but it is reduced to copper.

Therefore, the compound, even if it is a thiourea complex, which produces copper sulfide when an alkaline aqueous solution is heated, can not be used for the purpose of giving conductivity to a non-conductor because sulfide is generally a non-conductor.

pH value of the saturated solution of the complex disclosed in the invention at 20° C. is 4.0 and it is soluble in water, methanol, ethanol, acetone, methyl ethyl ketone, dioxane, tetrahydrofuran or dimethylformamide.

Whereas, within the group of synthetic resins which are non-conductors, there are resins such as polyacrylonitrile, polyvinyl chloride and polyvinylidene chloride which are soluble in tetrahydrofuran or dimethylformamide.

When these resins as mentioned above are treated with a tetrahydrofuran or dimethylformamide solution of the complex disclosed in the present invention, the surface of these resins is swelled and/or dissolved.

Therefore, the resins swelled absorb the complex of the present invention on each surface and/or are impregnated therewithin with the complex of the present invention.

Thus, the resins impregnated therewith are alkalized with ammonia in gas phase at temperature not exceeding 100° C., by which copper is deposited on the surface and into the inside of the resins.

Further, by heating polyacrylonitrile, polyvinyl chloride or polyvinylidene chloride in an ammoniacal alkaline aqueous solution of the complex of the present invention at a temperature not exceeding 100° C. in the presence of tetrahydrofuran or dimethylformamide, it is possible to deposit copper on the surface and inside of the resins by one process without pretreatment mentioned above.

As set forth above, the process by which copper is deposited on the surface and into the resins is neither a chemical plating process nor a coating process of metal powder using a binder, because these processes up to the present are the processes by which metal is deposited or coated only on the surface of the resins but it is not deposited into the resins.

Further, in order to alkalize an aqueous solution of the complex disclosed in the present invention, the same object as in the present invention can be achieved by using ethanolamine, diethanolamine, triethanolamine or ethylenediamine in place of ammonia.

In the present invention non-conductors represent generally inorganic and organic materials such as cellulose, cellulose derivative, wool, silk, synthetic resin, glass and fibers of asbestos and paper, non-woven fabrics, fabrics, plastics, wood, rubber, porcelain and rock and made therefrom.

The non-conductors as set forth above are insulators. It is well known that conductors are not susceptible to being charged with static electricity.

Thus, the non-conductors to which conductivity is given by the method disclosed in the present invention can not charge static electricity.

The first object of the present invention resides in preventing fiber from charging static electricity in spinning process.

In the spinning of synthetic fiber, it is most likely to charge static electricity and therefore, it is likely to give rise to trouble in the spinning process.

As set forth above, the trouble caused by static electricity can be prevented by the method of the present invention.

Spinning is carried out with the fiber to which conductivity is given.

Further, the second object of the present invention resides in preventing fabrics of a synthetic fiber from charging static electricity.

That is to say, by mixing the yarns to which conductivity is given by the present invention into yarns having the nature to be easily charged, the fabric which is prevented from charging static electricity can be obtained.

Further, the third object of the present invention resides in giving surface resistivity of $10^5$–$10^6$ ohms to base paper of an electrostatic duplicating paper. In manufacturing electrostatic duplicating paper, an electroconductive material must be precoated to begin with (for example an electrolyte) so as to make the base paper have a surface resistivity of $10^5$–$10^6$ ohms, thereafter zinc oxide or organic semiconductors are coated on the paper.

According to the method disclosed in the present invention, it is possible to give surface resistivity of $10^5$–$10^6$ ohms to the surface of the base paper of an electrostatic duplicating paper.

Further, the fourth object of the present invention is to give resistivity of 1–$10^2$ ohms to paper. That is to say, a base paper is heated at a temperature not exceeding 100° C. in an ammoniacal alkaline aqueous solution of the complex of the present invention, or after being impregnated with an aqueous solution of the complex to the base paper at room temperature, then ammonia is added in gas phase at not exceeding 100° C., thereby copper is deposited to the inside and on the surface of the base paper and by repeating the same process resistivity of 1–$10^2$ ohms can be given to the paper.

The conductive paper mentioned can be used as the base paper used for the purpose of low voltage discharge break down recording paper (high voltage discharge break down recording paper being used up to the present is manufactured as base paper by the method of mixing carbon black into pulp in order to give conductivity thereto. However, conductivity of carbon black is less than that of copper).

Furthermore, the fifth object of the present invention resides in giving conductivity to glass, porcelain, mineral, rock, synthetic fiber, plastic and wood. The non-conductor being given conductivity by the method mentioned can plate copper or other metals by means of the electroplating process up to the present.

Further, in the case when conductivity is given to synthetic fiber or plastics by the method of the present invention, pretreatment comprising chemical etching, sensitizing and activation processes mentioned above may be done, but it is of no use or little effect.

With respect to the present invention resistivity of a non-conductor treated by the method of the present invention has been measured by the circuit tester model SP–6 made by Sanwa Electric Instrument Co., Tokyo, Japan, at room temperature.

The measuring value thereof is an average value made 5 times with respect to the two points at an interval of 1 cm. on the surface of each sample.

Further, volume resistivities cited in Supplement of Modern Plastic Encyclopedia Issue, September 1963 and Manual of Electrochemistry, Japan, published Apr. 5, 1949, 2nd edition, pages 744–753 are referred to.

Example 1

15 ml. of a 20% aqueous solution of $$Cu((SCN_2H_4)_3)SCN$$

are put into a Pyrex glass beaker having a capacity of 100 ml. and 25 ml. of 1 N $NH_4OH$ are added thereto to make it alkaline, then the mixed solution becomes turbid.

In order to make it clear 30 ml. of a 10% aqueous solution of thiourea are added thereto and heated for 5 minutes at 80° C. on a water bath.

Then the inner wall of the beaker is coated with a continuous thin layer of a copper mirror, and a part of cuprous ion becomes copper powder and precipitates to the bottom of the beaker.

Then the beaker is emptied, washed with water and dried at 105° C.

The resistivity measured between the two points on the mirror surface taking an interval of 1 cm. shows $4.5 \times 12^2$ ohms (volume resistivity of Pyrex glass is $10^{14}$–$10^{16}$ ohms cm.).

Example 2

60 ml. of a 20% aqueous solution of $$Cu((SCN_2H_4)_3)SCN$$

are placed in a beaker and 100 ml. of 1 N $NH_4OH$ are added to become turbid. When 120 ml. of a 10% aqueous solution of thiourea are added to the mixed solution, it becomes clear. 0.3142 g. of 6 nylon filament 0.035 mm. in diameter is put into the clear solution, heated at 80° C. for 5 minutes on the water bath and taken out of the beaker and washed with water. Water is removed with 100 ml. of methanol and the filament is dried at room temperature until constant weight is obtained.

Thus, it has been found that the weight of the filament is 0.3355 g.

Accordingly, the weight of copper being deposited on the surface of the filament is 0.3355−0.3142=0.0213 (g.).

This shows that 6.87% of copper has been deposited based on the weight of the filament.

The resistivity of the filament measured with respect to the two points at an interval of 1 cm. on the surface is $10^4$ ohms.

Further, the resistivity of a bundle consisting of 265 filaments treated in the same way is measured with respect to the two points at an interval of 1 cm., is $10^2$ ohms (volume resistivity of 6 nylon is $5 \times 10^{12}$–$10^{13}$ ohms cm.).

Example 3

Polyacrylonitrile yarn 0.08 mm. in diameter shows $10^3$ ohms with respect to the two points at an interval of 1 cm., when treated under the same condition as shown in Example 2.

Example 4

0.4213 g. of polyacrylonitrile yarn 0.08 mm. in diameter is put into a mixed solution of 50 ml. of 20% aqueous solution of $Cu((SCN_2H_4)_3)SCN$ and 50 ml. of dimethylformamide solution of $Cu((SCN_2H_4)_3)SCN$, allowed to stand for 48 hours at room temperature, then the yarn is swelled to be impregnated with the complex of the present invention, thereafter the yarn is taken out of the mixed solution and then kept for 10 minutes in gas phase ammonia, washed with water and dried at room temperature until constant weight is obtained.

The resistivity measured with respect to the two points on the surface of the yarn at an interval of 1 cm. is $2 \times 10^2$ ohms.

Example 5

0.0622 g. of silk yarn 0.12 mm. in diameter is treated under the same condition by which 6 nylon is treated as shown in Example 2.

The resistivity measured with respect to the two points at an interval of 1 cm. is $2 \times 10^3$ ohms (volume resistivity of silk is $10^{12}$–$5 \times 10^{14}$ ohms cm.).

Example 6

Glass fiber 0.02 mm. in diameter is treated under the same condition by which 6 nylon is treated as shown in Example 2.

The resistivity measured with respect to the two points at an interval of 1 cm. is $10^4$ ohms (volume resistivity of glass fiber is $10^{14}$–$10^{16}$ ohms cm.).

Example 7

Polyethylene film (20 x 210 x 0.12 mm.) is treated under the same condition by which 6 nylon is treated as shown in Example 2.

The resistivity measured with respect to the two points at an interval of 1 cm. on its surface is $3 \times 10^2$ ohms (volume resistivity of polyethylene is $10^{13}$–$10^{16}$ ohms cm.).

Example 8

Polyvinyl chloride film (20 x 210 x 0.22 mm.) is treated under the same condition by which 6 nylon is treated as shown in Example 2.

The resistivity measured with respect to the two points at an interval of 1 cm. on its surface is $2 \times 10^2$ ohms (volume resistivity of polyvinyl chloride is $10^{11}$–$10^{13}$ ohms cm.).

Example 9

Polyvinylidene chloride film (20 x 210 x 0.01 mm.) is treated under the same condition by which 6 nylon is treated as shown in Example 2.

The resistivity measured with respect to the two points at an interval of 1 cm. on its surface is $3 \times 10^2$ ohms (volume resistivity of polyethylidene chloride is $10^{14}$–$10^{16}$ ohms cm.).

Example 10

Bakelite plate (3 x 20 x 30 mm.) is treated under the same condition by which 6 nylon is treated as shown in Example 2.

The resistivity measured with respect to the two points at an interval of 10 cm. on its surface is 90 ohms (volume resistivity of Bakelite is $10^{12}$–$10^{16}$ ohms cm.).

Example 11

Urea formaldehyde resin plate (3 x 20 x 30 mm.) is treated under the same condition by which 6 nylon is treated as shown in Example 2.

The resistivity measured with respect to the two points at an interval of 1 cm. on its surface is $3 \times 10^2$ ohms (volume resistivity of urea formaldehyde resin is $10^{13}$–$10^{14}$ ohms cm.).

Example 12

Alkyd resin plate (3 x 20 x 30 mm.) is treated under the same condition by which 6 nylon is treated as shown in Example 2.

The resistivity measured with respect to the two points at an interval of 1 cm. on its surface is $3 \times 10^2$ ohms (volume resistivity of alkyd resin is $10^{15}$–$10^{16}$ ohms cm.).

Example 13

Furfural resin plate (3 x 20 x 30 mm.) is treated under the same condition by which 6 nylon is treated as shown Example 2.

The resistivity measured with respect to the two points at an interval of 1 cm. on its surface is $2.5 \times 10^2$ ohms (volume resistivity of furfural resin is $10^6$–$10^{12}$ ohms cm.).

Example 14

Melamine formaldehyde resin plate (3 x 10 x 20 mm.) is treated under the same condition by which 6 nylon is treated as shown in Example 2.

The resistivity measured with respect to the two points at an interval of 1 cm. on its surface is $3.1 \times 10^2$ ohms (volume resistivity of melamine formaldehyde resin is $10^9$–$10^{11}$ ohms cm.).

Example 15

Polystyrol plate (3 x 10 x 20 mm.) is treated under the same condition by which 6 nylon is treated as shown in Example 2.

The resistivity measured with respect to the two points at an interval of 1 cm. on its surface is $2.2 \times 10^2$ ohms (volume resistivity of polystyrol is $10^{16}$–$10^{18}$ ohms cm.).

Example 16

Polyacrylester plate (3 x 20 x 30 mm.) is treated under the same condition by which 6 nylon is treated as shown in Example 2.

The resistivity measured with respect to the two points at an interval of 1 cm. on its surface is $3.15 \times 10^2$ ohms (volume resistivity of polyacrylester is $10^{12}$–$10^{16}$ ohms cm.).

Example 17

Methylmethacrylate resin plate (3 x 20 x 10 mm.) is treated under the same condition by which 6 nylon is treated as shown in Example 2.

The resistivity measured with respect to the two points at an interval of 1 cm. on its surface is $2.16 \times 10^2$ ohms (volume resistivity of methylmethacrylate is $10^{14}$–$10^{15}$ ohms cm.).

Example 18

Polyvinylcarbazole plate (3 x 20 x 30 mm.) is treated under the same condition by which 6 nylon is treated as shown in Example 2.

The resistivity measured with respect to the two points at an interval of 1 cm. on its surface is $2.1 \times 10^2$ ohms (volume resistivity of polyvinylcarbazole is $10^{13}$–$10^{15}$ ohms cm.).

Example 19

Polycarbonate plate (3 x 20 x 30 mm.) is treated under the same condition by which 6 nylon is treated as shown in Example 2.

The resistivity measured with respect to the two points at an interval of 1 cm. on its surface is $2.55 \times 10^2$ ohms (volume resistivity of polycarbonate is $2.1 \times 10^{16}$ ohms cm.).

Example 20

Silicone resin plate (2 x 20 x 30 mm.) is treated under the same condition by which 6 nylon is treated as shown in Example 2.

The resistivity measured with respect to the two points at an interval of 1 cm. on its surface is $2.1 \times 10^3$ ohms (volume resistivity of silicone resin is $10^{14}$ ohms cm.).

Example 21

Epoxy resin plate (2 x 20 x 30 mm.) is treated under the same condition by which 6 nylon is treated as shown in Example 2.

The resistivity measured with respect to the two points at an interval of 1 cm. on its surface is $2.2 \times 10^2$ ohms (volume resistivity of epoxy resin is $10^{15}$ ohms cm.).

Example 22

Ethylcellulose plate (2 x 20 x 30 mm.) is treated under the same condition by which 6 nylon is treated as shown in Example 2.

The resistivity measured with respect to the two points at an interval of 1 cm. is $3.2 \times 10^2$ ohms (volume resistivity of ethylcellulose is $10^2$–$10^{14}$ ohms cm.)

Example 23

Polypropylene plate (2 x 20 x 30 mm.) is treated under the same condition by which 6 nylon is treated as shown in Example 2.

The resistivity measured with respect to the two points at an interval of 1 cm. on its surface is $3.4 \times 10^2$ ohms (volume resistivity of polypropylene is $6.5 \times 10^{16}$ ohms cm.).

Example 24

Polytetrafluoroethylene plate (2 x 20 x 30 mm.) is treated under the same conditions by which 6 nylon is treated as shown in Example 2.

The resistivity measured with respect to the two points at an interval of 1 cm. on its surface is $2.1 \times 10^2$ ohms (volume resistivity of polytetrafluoroethylene is $10^{18}$ ohms cm.).

Example 25

Polyester plate (2 x 20 x 30 mm.) is treated under the same condition by which 6 nylon is treated as shown in Example 2.

The resistivity measured with respect to the two points at an interval of 1 cm. on its surface is $3.5 \times 10^2$ ohms (volume resistivity of rubber is $10^{14}$–$10^{16}$ ohms cm.).

Example 26

Rubber tube (1 cm. in peripheral diameter, 3 cm. in length) is treated under the same condition by which 6 nylon is treated as shown in Example 2.

The resistivity measured with respect to the two points at an interval of 1 cm. on its surface is $2.5 \times 10^2$ ohms (volume resistivity of ebonite is $10^{13}$–$10^{15}$ ohms cm.).

Example 27

Ebonite plate (2 x 20 x 30 mm.) is treated under the same condition by which 6 nylon is treated as shown in Example 2.

The resistivity measured with respect to the two points at an interval of 1 cm. on its surface is $3.4 \times 10^2$ ohms (volume resistivity of ebonite is $10^{13}$–$10^{15}$ ohms cm.).

Example 28

Mica (1 x 20 x 30 mm.) is treated under the same condition by which 6 nylon is treated as shown in Example 2.

The resistivity measured with respect to the two points at an interval of 1 cm. on its surface is $2.25 \times 10^2$ ohms (volume resistivity of mica is $10^{13}$–$10^{17}$ ohms cm.).

Example 29

Rock crystal (14 x 14 x 50 mm.) is treated under the same condition by which 6 nylon is treated as shown in Example 2.

The resistivity measured with respect to the two points at an interval of 1 cm. on its surface is $5.2 \times 10^2$ ohms (volume resistivity of rock crystal is $10^{14}$–$10^{17}$ ohms cm.).

Example 30

Instead of Pyrex glass beaker, porcelain crucible is used under the same condition as that of Example 1.

The resistivity measured with respect to the two points on its inner wall copper mirror is $4.23 \times 10^2$ ohms (volume resistivity of porcelain is $10^{12}$–$10^{16}$ ohms cm.).

Example 31

Instead of Pyrex glass beaker, fused silica crucible is used under the same condition as that of Example 1.

The resistivity measured with respect to the two points on its inner wall copper mirror is $4.2 \times 10^2$ ohms (volume resistivity of fused silica is $10^{12}$–$5 \times 10^{18}$ ohms cm.).

Example 32

Veneer plywood of cherry wood (1 x 20 x 30 mm.) is placed in a 20% aqueous solution of $Cu((SCN_2H_4)_3)SCN$ and kept for 3 hours at room temperature and after being impregnated with the complex, the veneer is removed from the solution and kept in ammonia vapour for 5 minutes at 80° C., then washed with water and dried at 105° C. until constant weight is obtained.

The resistivity measured with respect to the two points at an interval of 1 cm. on its surface is $3.75 \times 10^2$ ohms (volume resistivity of dry wood is $10^{10}$–$10^{12}$ ohms cm.).

Example 33

Cotton fabric (0.22 x 50 x 50 mm.) is treated under the same condition as that of Example 32.

The resistivity measured with respect to the two points at an interval of 1 cm. on its surface in each direction is $3.1 \times 10^2$ ohms (volume resistivity of cotton is $10^8$–$10^{12}$ ohms cm.).

Example 34

Polyester fabric (0.11 x 50 x 50 mm.) is treated under the same condition as that of Example 32.

The resistivity measured with respect to the two points at an interval of 1 cm. on its surface in each direction is $3.6 \times 10^2$ ohms.

Further, the resistivity measured in the direction of thickness in the same way is 21 ohms (volume resistivity of polyester is $10^{14}$ ohms cm.).

Example 35

Asbestos tape (2.1 x 25 x 230 mm.) is treated under the same condition as in Example 32.

The resistivity measured with respect to the two points at an interval of 1 cm. on its surface in each direction is 65 ohms.

Further, the resistivity measured in the direction of thickness is 50 ohms (volume resistivity of asbestos is $10^{10}$–$10^{14}$ ohms cm.).

Example 36

Base paper (50 g./m.²) for impregnation consisting of 100% coniferous kraft pulp is treated under the same condition as in Example 32.

The resistivity measured with respect to the two points at an interval of 1 cm. on its surface is $2.25 \times 10^2$ ohms.

Further, the resistivity measured in the same way in the direction of thickness is 51 ohms.

The paper was treated repeatedly 2 times under the same condition. Then the resistivity measured with respect to the two points at an interval of 1 cm. on its surface was 12 ohms.

Further, the resistivity measured in the direction of thickness is 5 ohms (volume resistivity of paper is $10^9$–$10^{13}$ ohms cm.).

EXAMPLE 37

15 ml. of 20% aqueous solution of the complex of the present invention are placed in a Pyrex glass beaker and treated under the same condition as shown in Example 1, but 1 N aqueous ethanolamine solution is used instead of ammoniacal solution to alkalize the mixed solution.

The resistivity measured with respect to the two points at an interval of 1 cm. on its copper mirror surface of the inner wall of the beaker is $5.4 \times 10^2$ ohms.

EXAMPLE 38

15 ml. of 20% aqueous solution of the complex of the present invention are placed in a Pyrex glass beaker and treated under the same condition as shown in Example 1, but 1 N aqueous diethanolamine is used instead of ammonia to alkalize the mixed solution.

The resistivity measured with respect to the two points at an interval of 1 cm. on its copper mirror surface of the inner wall of the beaker is $4.4 \times 10^2$ ohms.

EXAMPLE 39

15 ml. of 20% aqueous solution of the complex of the present invention are placed in a Pyrex glass beaker and treated under the same condition as shown in Example 1, but 1 N aqueous triethanolamine is used instead of ammonia to alkalize the mixed solution.

The resistivity measured with respect to the two points at an interval of 1 cm. on its copper mirror surface of the inner wall of the beaker is $5.4 \times 10^2$ ohms.

EXAMPLE 40

15 ml. of 20% aqueous solution of the complex of the present invention are placed in a Pyrex glass beaker and treated under the same condition as shown in Example 1, but 1 N ethylenediamine is used instead of ammonia to alkalize the mixed solution.

The resistivity measured with respect to the two points at an interval of 1 cm. on its copper mirror surface of the inner wall of the beaker is $4.4 \times 10^2$ ohms.

I claim:

1. A method for imparting conductivity to a non-conductor by depositing copper on the surface thereof, which comprises heating a non-conductor at a temperature of from about 80° C. to about 100° C. in an aqueous alkaline solution of $Cu((SCN_2H_4)_3)SCN$ containing at least one alkali selected from the group consisting of ammonia, ethanolamine, diethanolamine, triethanolamine and ethylenediamine.

2. A method according to claim 1 wherein the non-conductor is nylon.

3. A method according to claim 1 wherein the non-conductor is polyacrylonitrile.

4. A method according to claim 1 wherein the non-conductor is silk.

5. A method according to claim 1 wherein the non-conductor is polyethylene.

6. A method according to claim 1 wherein the non-conductor is polyvinyl chloride.

7. A method according to claim 1 wherein the non-conductor is polyvinylidene chloride.

8. A method according to claim 1 wherein the non-conductor is Bakelite.

9. A method according to claim 1 wherein the non-conductor is a urea formaldehyde resin.

10. A method according to claim 1 wherein the non-conductor is an alkyd resin.

11. A method according to claim 1 wherein the non-conductor is a furfural resin.

12. A method according to claim 1 wherein the non-conductor is a melamine formaldehyde resin.

13. A method according to claim 1 wherein the non-conductor is a polystyrene.

14. A method according to claim 1 wherein the non-conductor is a polyacrylate.

15. A method according to claim 1 wherein the non-conductor is a methyl methacrylate.

16. A method according to claim 1 wherein the non-conductor is a polyvinylcarbazole.

17. A method according to claim 1 wherein the non-conductor is a polycarbonate.

18. A method according to claim 1 wherein the non-conductor is a silicone resin.

19. A method according to claim 1 wherein the non-conductor is an epoxy resin.

20. A method according to claim 1 wherein the non-conductor is ethyl cellulose.

21. A method according to claim 1 wherein the non-conductor is a polypropylene.

22. A method according to claim 1 wherein the non-conductor is a polytetrafluoroethylene.

23. A method according to claim 1 wherein the non-conductor is a polyester.

24. A method according to claim 1 wherein the non-conductor is a rubber.

25. A method according to claim 1 wherein the non-conductor is ebonite.

26. A method according to claim 1 wherein the non-conductor is mica.

27. A method according to claim 1 wherein the non-conductor is rock crystal.

28. A method according to claim 1 wherein the non-conductor is a porcelain.

29. A method according to claim 1 wherein the non-conductor is fused silica.

30. A method according to claim 1 wherein the alkali is ethanolamine.

31. A method according to claim 1 wherein the alkali is diethanolamine.

32. A method according to claim 1 wherein the alkali is triethanolamine.

33. A method according to claim 1 wherein the alkali is ethylenediamine.

34. A method according to claim 1 wherein the non-conductor is a glass.

35. A method for imparting conductivity to a non-conductor which comprises impregnating the non-conductor with an aqueous $CU((SCN_2H_4)_3)SCN$ solution and adding gaseous ammonia thereto at a temperature of from about 80° C. to about 100° C.

36. A method according to claim 35 wherein the non-conductor is wood.

37. A method according to claim 35 wherein the non-conductor is paper.

38. A method according to claim 35 wherein the non-conductor is cotton fabric.

39. A method according to claim 35 wherein the non-conductor is a polyester fabric.

40. A method according to claim 35 wherein the non-conductor is a polyacrylonitrile fabric.

41. A method according to claim 35 wherein the non-conductor is nylon fabric.

42. A method according to claim 35 wherein the non-conductor is a woolen fabric.

43. A method according to claim 35 wherein the non-conductor is a polyvinyl alcohol fabric.

44. A method according to claim 35 wherein the non-conductor is a polyvinylidene chloride fabric.

45. A method according to claim 35 wherein the non-conductor is a polyvinyl chloride fabric.

46. A method according to claim 35 wherein the non-conductor is a polyethylene fabric.

47. A method according to claim 35 wherein the non-conductor is a polypropylene fabric.

48. A method according to claim 35 wherein the non-conductor is a polytetrafluoroethylene fabric.

49. A method according to claim 35 wherein the non-conductor is asbestos fabric.

50. A method according to claim 35 wherein tetrahydrofuran or dimethylformamide is added to the solution.

References Cited

UNITED STATES PATENTS 3,499,881   3/1970   Poppe et al. _____ 117—227

WILLIAM L. JARVIS, Primary Examiner

U.S. Cl. X.R.

106—1; 117—213, 47 R, 47 A, 160 R